United States Patent [19]

Costa

[11] 4,032,055

[45] June 28, 1977

[54] FEED DEVICE FOR TAPE PERFORATORS

[75] Inventor: Armando Costa, Ivrea (Turin), Italy

[73] Assignees: Ing. C. Olivetti & C., S.p.A.; Ufficio Brevetti, both of Turin, Italy

[22] Filed: Apr. 9, 1976

[21] Appl. No.: 675,368

[30] Foreign Application Priority Data

Apr. 18, 1975 Italy .................................. 67985/75

[52] U.S. Cl. .................................... 226/76; 74/125;
74/578; 226/134; 226/157
[51] Int. Cl.² ......................................... B65H 17/40
[58] Field of Search ............ 226/76, 134, 156, 157;
271/266; 74/577 R, 578, 125, 124

[56] References Cited

UNITED STATES PATENTS

| | | | |
|---|---|---|---|
| 2,825,441 | 3/1958 | Tholstrup ..................... | 226/157 X |
| 3,083,580 | 4/1963 | Carson et al. .................... | 74/577 X |
| 3,132,554 | 5/1964 | Boudreau et al. ............... | 74/125 X |

FOREIGN PATENTS OR APPLICATIONS 1,186,114  4/1970  United Kingdom ............... 226/157

Primary Examiner—John J. Love
Assistant Examiner—Bruce H. Stoner, Jr.
Attorney, Agent, or Firm—Schuyler, Birch, Swindler, McKie & Beckett

[57] ABSTRACT

A tape feeding apparatus for perforators or reader of punched tape in which a circular cam continuously rotates in a slot machined in a first lever. A second lever, selectively activated by an electromagnet, enables the first lever to be operated by the cam for jogging a saw tooth wheel integral with a sprocket pulley, feeding the paper.

3 Claims, 3 Drawing Figures

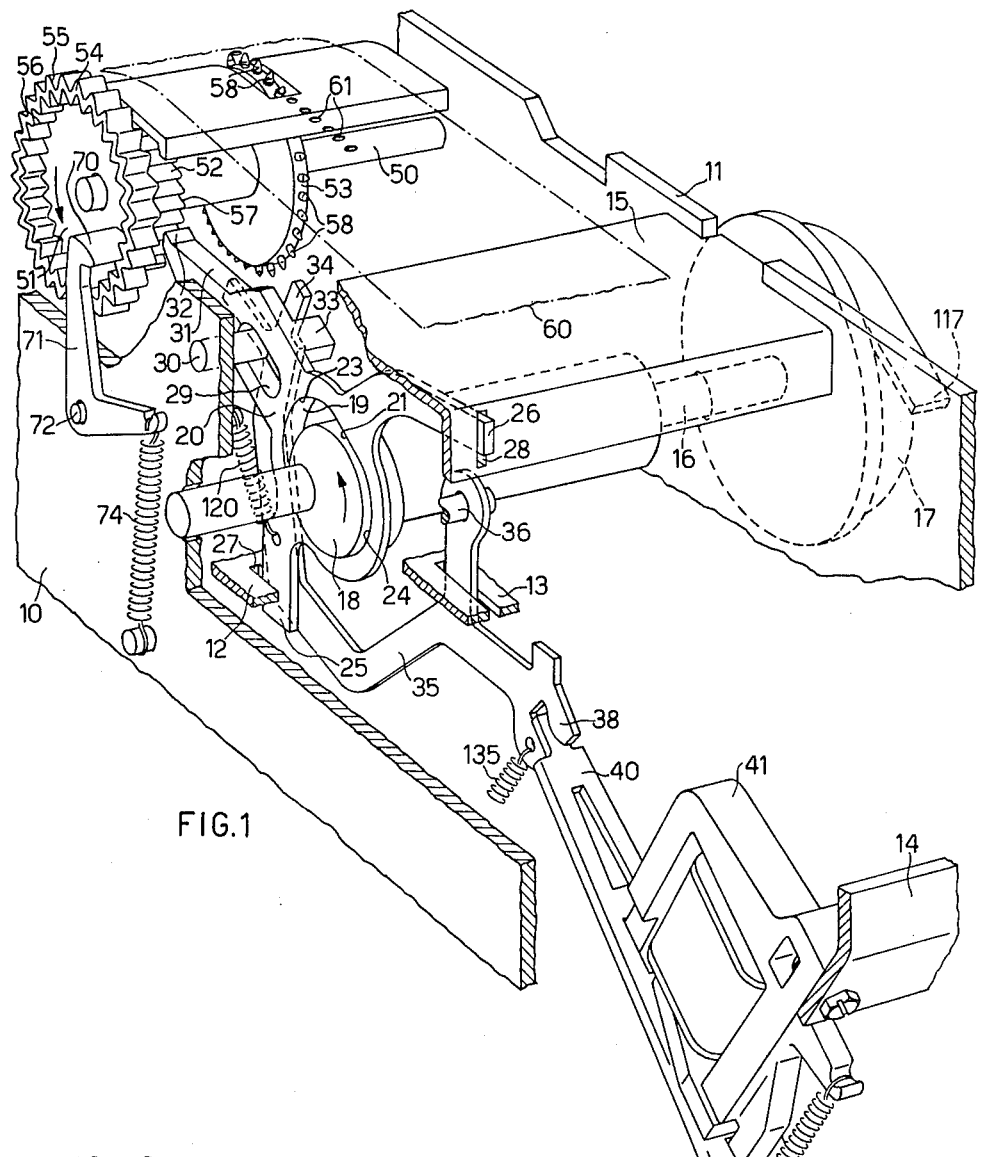
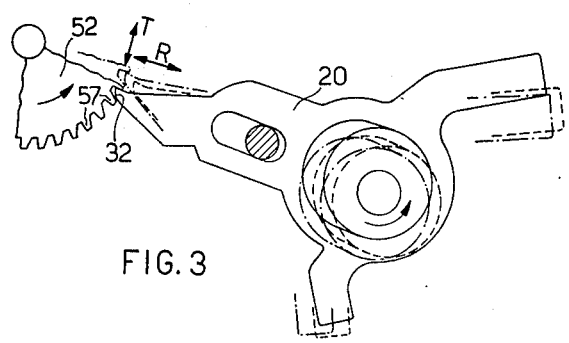

FEED DEVICE FOR TAPE PERFORATORS

BACKGROUND OF THE INVENTION

1. Field of Invention

This invention is related to both perforators and perforated tape readers for machines designed to transmit and process data.

More particularly, this invention refers to a ratchet-gear device for feeding tape for perforators or perforated tape readers for teleprinters and the like for intermittent or continuous perforated tape reading.

2. Description of the Prior Art

Devices for feeding perforated tape for tape perforators or readers are already known. In a device, described in U.S. Pat. No. 3,051,381, the first lever is pivotally mounted on a second lever splined to the shaft of an electric motor. When the electric motor is energized, it causes the second lever to partially rotate, which in its turn displaces the first lever until it meshes with a gear incorporated with the tape feed shaft, with its one end, in order to make it rotate by one feed pitch. When the gear has advanced by one feed pitch, the second lever end meshes with the gear to lock it and thus avoid further advance caused by inertia of the gear itself.

This device necessitates an independent starting motor to achieve tape advance thus rendering the device more complex and costly; beside this it requires a separate lever to lock the gear after it has rotated by one pitch, this causing considerable noise and a greater tendency for faults owing to repeated impact of levers against the gear.

SUMMARY OF THE INVENTION

These and other disadvantages are overcome by the feed device for perforators and readers, in which a pin-wheel is intergral with an idle shaft and a cam, fixed to a drive shaft, activates a first lever for meshing periodically with a gear with offset teeth mounted on the idle shaft for feeding the perforated tape; a second lever, activated selectively by an electromagnet, restrains the first lever from meshing with the gear when the tape is to be stopped.

These characteristics and other advantages achieved by the device according to the invention will be clarified by the following detailed description of the preferred embodiment carried out as an unlimiting example and further illustrated in the accompanying drawings.

BRIEF DESCRIPTION OF THE DRAWINGS

FIG. 1 is a partial perspective view of the punched tape feeding device according to the invention;

FIG. 3 is a diagram of the movement of the pivoting lever.

DETAILED DESCRIPTION OF THE INVENTION

Figure 2:
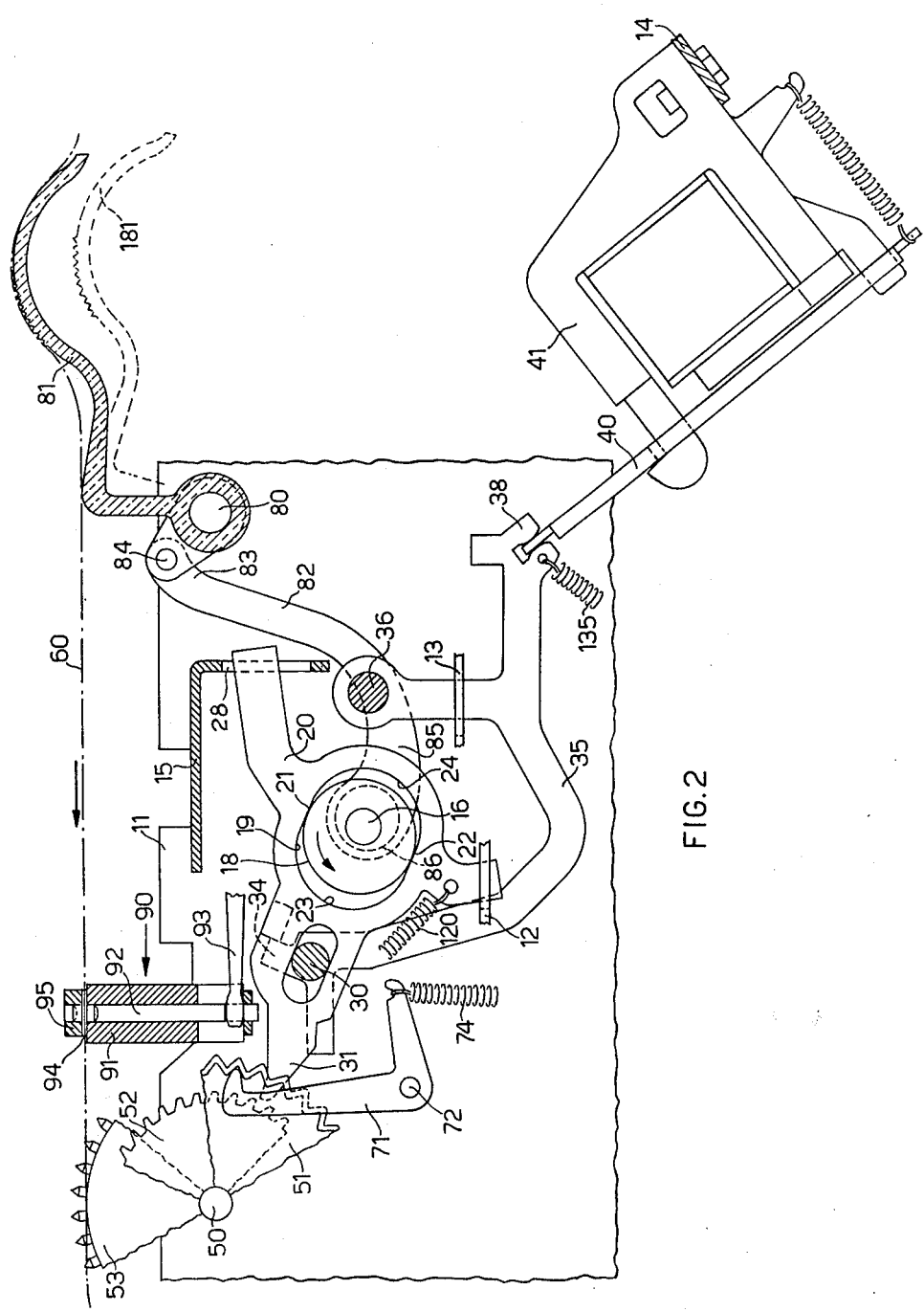
FIG. 2 is a left-hand side view of FIG. 1.

Referring to FIGS. 1 and 2, the device according to the invention is embodied in a rigid metallic structure made up of frames 10 and 11, transversely connected to each other by bent metal crossbars 12, 13, 14 and 15.

A camshaft 16 pivots on frames 10 and 11, pulley 17 is splined to one end of camshaft 16 and this pulley is driven by a motor which does not appear in the drawings, by means of belt 117.

Cam 18, incorporated with shaft 16, engages slot 19 of lever 20.

Slot 19 has a profile formed by two parallel straight lines 21 and 22, joined by two circular arcs 23 and 24, having the same radius as the external radius of cam 18.

Lever 20 is provided with two extensions 25 and 26 which respectively engage corresponding guiding slots 27 and 28 machined on crossbars 12 and 15, respectively.

Lever 20 also has a slot 29, associating with pin 30, fixed to frames 10. Slot 29 is extended towards pulley 52 radially.

Furthermore, front end 31 of lever 20 ends in the form of a tab 32.

Finally, a tongue 33, fitted to lever 20 in alignment with slot 29, associates with projection 34 of lever 35 hinged on to pivot 36 fitted to frames 10 and 11.

Lever 35 has an extension 38, having a fork shape, which engages armature 40 of electromagnet 41, which is always fitted to crossbar 14.

Pulleys 51, 52 and 53 are splined to shaft 50, pivoting on frames 10 and 11.

Pulley 51 has a crown 54, which is toothed both internally 55, and externally 56.

Pulley 52 is saw-toothed externally and pulley 53 is provided with a plurality of pins 58 on its surface, designed to feed tape 60, by engaging a row of holes 61 longitudinally aligned in a median position along the tape itself.

The internal teeth 56 of pulley 51 mesh with tooth 70 of positioner 71, pivotally mounted on pivot 72, fitted to frame 10 and held in contact with teeth 56 by a spring 74.

Pulley 52 is aligned with the end of tab 32 of lever 20.

Arm 81, having an extended and arched shape, can pivot on shaft 80 (FIG. 2) fitted to frames 10 and 11. Arm 81 is located in a longitudinal sense in respect to tape 60.

Arm 81 is moved by a lever 82, the end of which is hinged to pin 84 fitted to the arm 81, and the other end 85 engages with cam 86 incorporated with shaft 16 and shifted about 180° out of phase in respect to cam 18.

The perforating device 90, made up of block 91 for guiding punches 92, is fitted transversely to frames 10 and 11 in an intermediate position between arm 81 and feed pulley 53 (FIG. 2). The punches are selectively moved in the already known manner by a plurality of lever arms 93. Tape 60 passes trough a narrow slit 94, machined between block 91 and die-plate 95.

The device operates in the following manner:

As has already been said, the feed device for perforated tape is fitted to a teleprinter consisting of a sole electric motor for actuating all its functions. Said sole motor keeps shaft 16 rotating continuously by means of belt 117.

In the rest mode, that is when tape 60 must not be advanced, electromagnet 41 is deenergized, so that lever 35 is rotated clockwise by the action of spring 135. Consequently, projection 34 of lever 35 intercepts tongue 33 of lever 20 preventing it from moving against gear teeth 57 of gear 52, so that cam 18 may rotate freely on the inside of slot 19 which, as has already been explained, is extended towards the movement of lever 20 towards teeth 57.

When in the operating mode, electromagnet 41 is energized, armature 40 makes lever 35 rotate counterclockwise, moving projection 34 away from tongue 33. Consequently, lever 20 is biased by spring 120 in a radial direction towards pulley 52, so that tab 32 of lever 20 may be inserted in the space between the two consecutive teeth 57.

As a consequence of the rotation of cam 18, lever 20 performs sinusoidal pivoting, which translated to the end of end 32 of lever 20, may be divided into two components (FIG. 3); one a radial R and the other a tangential T in respect to pulley 52. As a consequence of the tangential component T, tab 32 moves pulley 52 in a rotating movement, being engaged between teeth 57 as shown in FIG. 3, as a continuous line, when lever 20 initiates the movement, and with dots and dashes when lever 20 terminates the movement of pulley 52.

As a consequence of the radial component, tab 32 is moved away from pulley 52 periodically, and then inserted again in the following space between teeth 57, as shown in FIG. 3 with dashed lines.

The values of eccentricity of cam 18 and of the arm of lever 20 in respect to fixed pin 30 are such that tab 32 rotates pulley 52 by exactly one feed pitch of tape 60 at each cycle of shaft 16. The fact that the two components of movement of tab 32 are sinusoidal is considerably advantageous: in fact since the tangential component of movement varies from zero to the maximum and back to zero again, this causes tab 32 to follow the movement of the entire rotating arc which corresponds to one pitch of wheel 52, accelerating and decelerating until pulley 52 is arrested. More particularly, when movement has taken place by one pitch, the pulley is arrested by tab 32 this avoiding incorrect positioning of the pulley owing to inertia.

Besides this, both insertion and withdrawal of tab 32 by pulley 52 take place gradually without impact, thus rendering the movement very silent. The radial component of the movement of tab 32 has the purpose of keeping end 32 of lever 20 out of the path of teeth 57 during the return phase and to keep tab 32 meshed with teeth 57 during the advance phase.

It is to be noted that the approach of lever 20 towards pulley 52 is the negative type, as during this phase spring 120 acts on lever 20, biasing it towards wheel 52 while cam 18 acts in the reverse phase, defeating the action of spring 120.

The purpose of positioner 71 (FIG. 1) is mainly to keep pulley 54 and thus wheel 53, in the position reached during the return phase during which tab 32 is disengaged from teeth 57. Another advantage of the feed mechanism according to this invention is to enable starting and stopping the advance of tape 60 in such as a way as to be completely independent from the movement of shaft 16, which can then keep rotating continuously.

In order to avoid the tape from being torn or perforation 61 being damaged by an excessive stress of traction of pins 58 of pulley 53, arm 81 pivots vertically and lifts tape 60 periodically. The pivoting movement of arm 81 causes the tape to form a loop, the length of which is about the same as one feed pitch.

In this way, pins 58 of pulley 53, may easily feed the tape and recover the length of the loop, being lightened by the action of arm 81 in the task of unrolling the tape from the reel, not appearing in the drawings, on which it is wound. The pivoting movement of arm 81 is shifted about 180° out of phase from the tape advance cycle. In fact, while tab 32 of lever 20 meshes with teeth 57 of pulley 52, arm 81 is in position 181 shown in a broken line in FIG. 2. Viceversa, while tab 32 performs its return path, at the end of an advance movement, arm 81 is lifted as far as position 81, causing tape 60 is unwind certain length of tape from the reel, since it is held by punches 92 from the opposite side during the perforating phase.

It is understood that the device according to the invention particularly shown and described above, may be modified, added to or have parts replaced without departing from the spirit and scope of the invention as defined in the appended claims.

What I claim is:

1. A tape feeding apparatus for perforators or readers of a punched tape, comprising:
   a frame;
   a supporting shaft rotatably mounted to said frame;
   a sprocket pulley mounted on said supporting shaft for rotation therewith for advancing the tape;
   a first lever pivotally mounted to the frame and having a first and a second slot and a tab on one end thereof, said second slot disposed between said first slot and said one end;
   a guiding element fixed to said frame and in cooperative engagement with said second slot;
   a saw toothed pulley integral with said sprocket pulley and coactive with said first lever to be jogged by said tab;
   spring means connecting said first lever to said frame, said spring means urging said tab into positive contact with a tooth of said saw toothed pulley; to effect the rotation of said saw toothed pulley; and
   a circular cam rotatably mounted inside said first slot and acting positively in only one sense on said first lever in opposition to said spring means, to withdraw said tab from said saw toothed pulley and to impart to said one end movement along a substantially circular path, wherein in a first arc of said circular path said tab is moved away from a contacted tooth, in a second arc of said path, said tab is spaced away from the contacted tooth of said toothed pulley, and in a third arc of said path said tab returns towards the next tooth of said toothed pulley.

2. Apparatus as in claim 1, further comprising:
   a selectively operable electromagnet, and
   a second lever pivotally connected to said frame and cooperative with said first lever, and activatable by said electromagnet for movement between an operating position and a rest position, wherein said second lever in said rest position keeps said tab of said first lever substantially away from said saw toothed pulley and in said operating position enables said spring means to bring said tab into mesh with said saw toothed pulley in synchronism with said circular cam.

3. Apparatus as in claim 2, wherein said first slot has a profile comprising two parallel lines joined by two semi-circular arcs and wherein the distance between the centers of said two arcs is greater than the eccentricity of said cam.

* * * * *

UNITED STATES PATENT OFFICE
CERTIFICATE OF CORRECTION

Patent No. 4,032,055    Dated June 28, 1977

Inventor(s) Armando Costa

It is certified that error appears in the above-identified patent and that said Letters Patent are hereby corrected as shown below:

Page 1, Assignee, change "Assignees: Ing. C. Olivetti & C., S.p.A.; Ufficio Brevetti, both of Turin, Italy"

to --Assignee: Ing. C. Olivetti & C., S.p.A., of Turin, Italy--

Signed and Sealed this

Eighteenth Day of October 1977

[SEAL]

Attest:

RUTH C. MASON  
Attesting Officer

LUTRELLE F. PARKER  
Acting Commissioner of Patents and Trademarks